Figure 1:
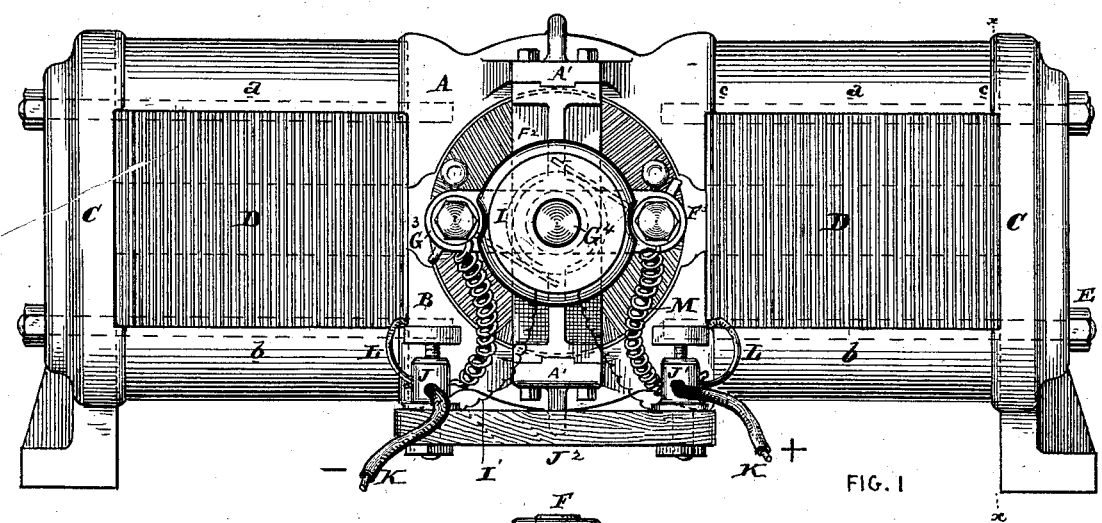

(No Model.) 3 Sheets—Sheet 1.

R. M. HUNTER.
ELECTRIC MOTOR AND DYNAMO ELECTRIC MACHINE.

No. 363,466. Patented May 24, 1887.

Attest
E. M. Breckinreed.
E. McDermott.

Inventor
[signature]

(No Model.) 3 Sheets—Sheet 2.
R. M. HUNTER.
ELECTRIC MOTOR AND DYNAMO ELECTRIC MACHINE.
No. 363,466. Patented May 24, 1887.
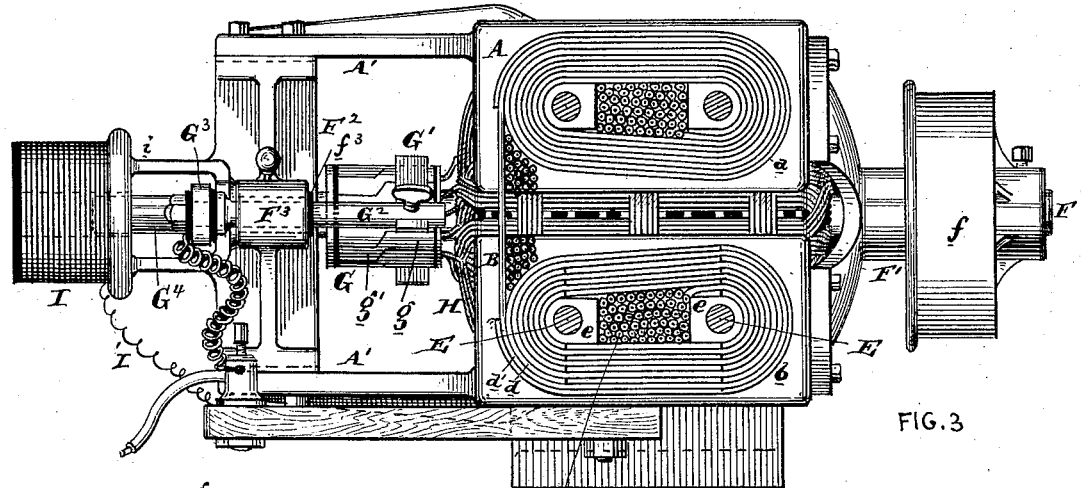
FIG. 3
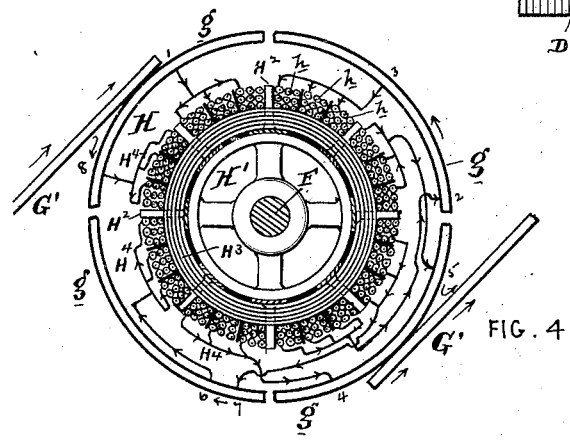
FIG. 4
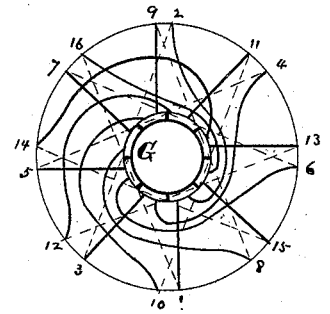
FIG. 5
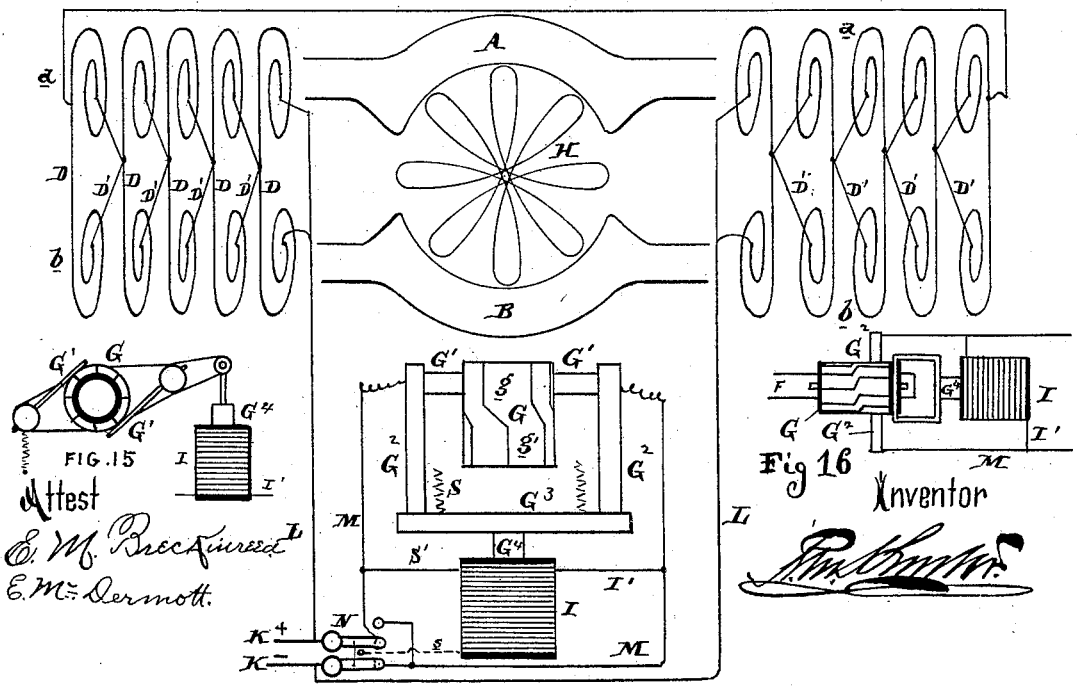
Attest
E. M. Breckinridge
E. McDermott
Inventor
R. M. Hunter
N. PETERS, Photo-Lithographer, Washington, D. C.

(No Model.) 3 Sheets—Sheet 3.
R. M. HUNTER.
ELECTRIC MOTOR AND DYNAMO ELECTRIC MACHINE.
No. 363,466. Patented May 24, 1887.
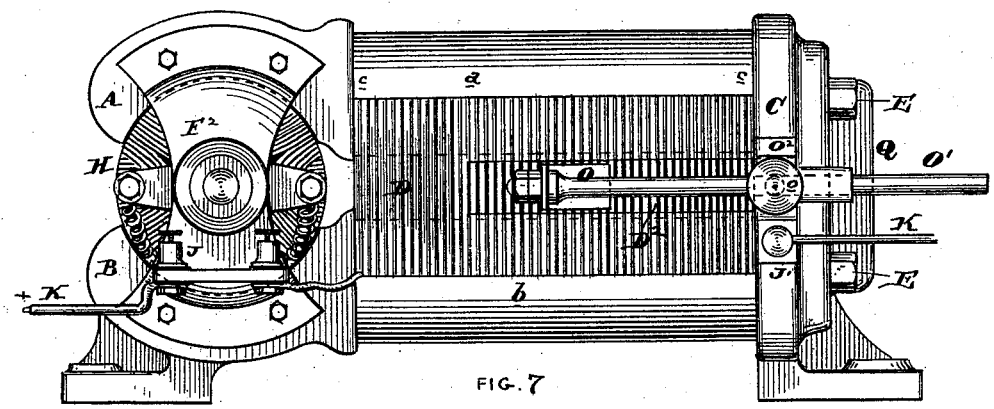
FIG. 7.
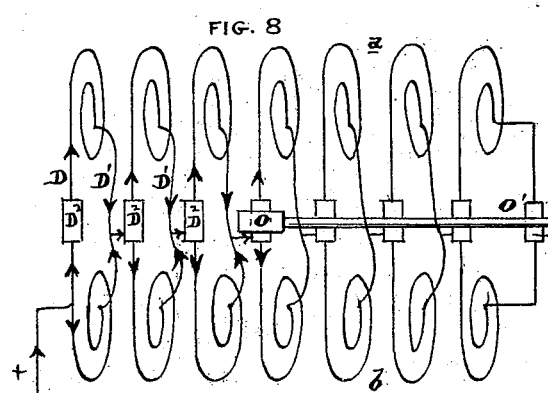
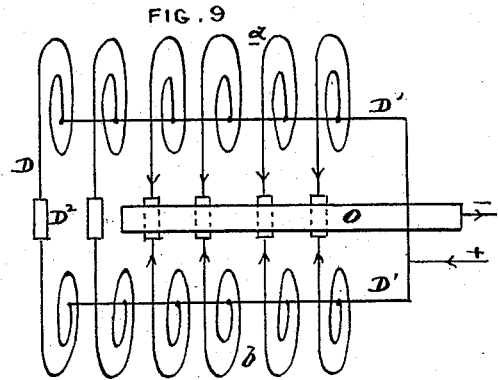
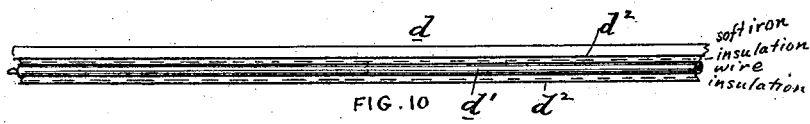
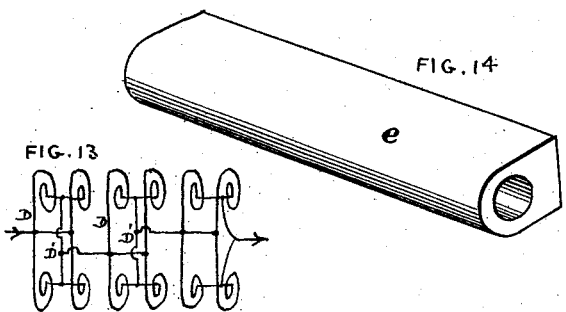
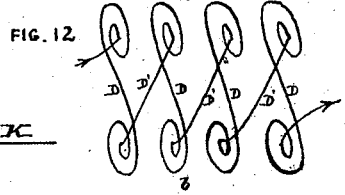
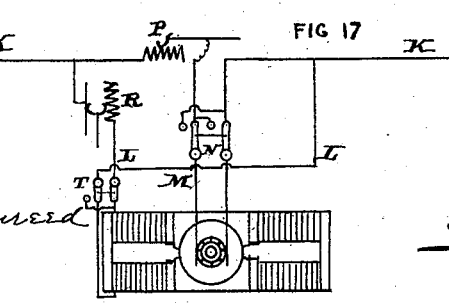
Attest
E. M. Breckinerd
E. McDermott
Inventor
R. M. Hunter
N. PETERS, Photo-Lithographer, Washington, D. C.

UNITED STATES PATENT OFFICE.

RUDOLPH M. HUNTER, OF PHILADELPHIA, PENNSYLVANIA.

ELECTRIC MOTOR AND DYNAMO-ELECTRIC MACHINE.

SPECIFICATION forming part of Letters Patent No. 363,466, dated May 24, 1887.

Application filed October 15, 1886. Serial No. 216,321. (No model.)

*To all whom it may concern:*

Be it known that I, RUDOLPH M. HUNTER, of the city and county of Philadelphia and State of Pennsylvania, have invented an Improvement in Electric Motors and Dynamos, of which the following is a specification.

My invention has reference to electric motors or dynamo-electric machines; and it consists of certain improvements, all of which are fully set forth in the following specification, and shown in the accompanying drawings, which form part thereof.

My invention embodies—

First. A peculiar construction of field-magnet and method of coupling up the coils thereof; also, the means of regulating the power of such magnets.

Second. An automatic device for shifting the brushes or commutator, changing the lead of the former with reference to the latter in reversing the motor. This is advantageous in motors located where it is not convenient to get to the brushes to shift them—as, for instance, in the case of motors on a truck or electrically-propelled vehicle for an electric-railway. The act of reversing the current in the armature-circuit simultaneously and automatically operates to shift the lead. As the armature itself acts as a magnet, the magnetic lines of force in the field will deviate upon reversing the motor, and will take an angular position different from that assumed when the motor is running the other way. The diameter of commutation is substantially at right angles to the resultant lines of force in machines like the Gramme and Siemens, and parallel and with such lines in the Brush type, and these diameters of commutation will be shifted upon reversing the motor, and this shift or lead will depend upon the intensity of the magnetic field and strength of current in the armature.

Third. A motor with independent field-magnet and armature-circuits, in which may be means to change the strength of the field-magnets and modify the resistance of the armature-circuit.

Fourth. An armature with its coils subdivided, the subdivisions in each main coil being coupled together in multiple-arc connection and the main coils in series. This construction enables the resistance of the armature to be kept down, and considerably increases the power of the armature with a given current of strength.

The foregoing are the general features of my improvements; but, specifically, there are many features of invention clearly set out hereinafter.

In the construction of my field-magnets I arrange the conductor-coils in spirals such as would be formed by coiling the wire in a plane at right angles to the axis of the magnet and interposing between the layers of wire formed by a series of such coils arranged parallel a similar coil of sheet metal, soft iron, or steel. This ductile magnetizable metal may be made in sections, the splits coming longitudinally, so as to reduce the tendency to Foucault currents. The cores or magnets so produced are clamped between cast-iron pole-pieces and butt or neutral parts, and their centers, or inner parts, are made hollow for the reception of the inner terminals of the spiral wires, which may be coupled in various ways with the outer terminals of their own magnet-coils, or with the inner terminals of the magnet of opposite polarity. The ways in which these spirals may be coupled up with each other and with the line are fully explained hereinafter. A magnet of this description has great strength, as the wire is brought close to the magnetizable core and produces the best inductive action; and, as one of the terminals, at least, of all of the spirals is exposed, it is an easy matter to provide suitable means for cutting out one or more of the coils or spirals to vary the power of the field-magnets.

In operating motors it is desirable in starting to have a strong field, and after the motors attain a maximum speed to reduce the power of said field. It is also desirable in increasing the speed of the motor to gradually decrease the resistance of the armature-circuit.

In many cases it is desirable to change the strength of the field and not the resistance of the armature, and vice versa; hence the advisability of the independent means of regulation.

Figure 2:
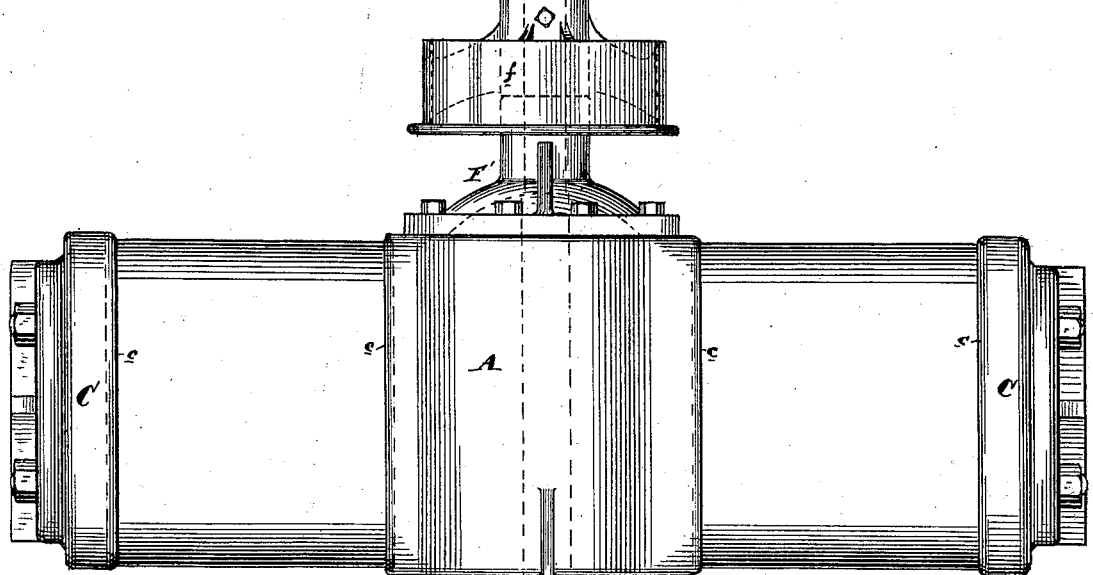

In the drawings, Figure 1 is a side elevation of an electric motor or dynamo-electric machine embodying my invention. Fig. 2 is a plan view of same. Fig. 3 is a cross-section of same on line x x, Fig. 1. Fig. 4 is a cross-sectional elevation of the armature, showing its connection with the commutator. Fig. 5 is a diagram representing the general plan of coupling up the coils of the armature, it being what is known as the "Siemens winding." Fig. 6 is a diagram showing the arrangement of circuits in the machine. Fig. 7 is a side elevation of a modified form of my invention. Fig. 8 is a diagram illustrating the arrangement of field-magnet circuits in the construction shown in Fig. 7. Fig. 9 is another method of coupling up the field-magnet coils. Fig. 10 is a diagram showing the layers forming the field-magnets before winding. Fig. 11 is a diagram representing a form of winding for a single magnet. Figs. 12 and 13 are diagrams illustrating modified forms of winding for the field-magnets. Fig. 14 is a perspective view of one of the core-pieces removed from the field-magnets. Fig. 15 is an elevation showing a modified form of brush-moving apparatus for reversing the motor. Fig. 16 is a plan view of a modified apparatus for the same general purpose, but in which the commutator is moved in place of the brushes; and Fig. 17 is a plan view showing the different circuits for the field-magnets and armature.

A and B are the two poles of the field-magnets $a$ and $b$, which may be made double, as in Fig. 1, or single, as in Fig. 7. These pole-pieces are of good homogeneous gray iron, but may, if desired, be made of forged iron or steel. These magnets $a$ and $b$ are formed of alternate layers of a ductile magnetizable metal, as iron or steel, $d$, and insulated wires $d'$, arranged parallel to the direction of winding, and to insure a most perfect insulation good insulation-paper may be placed upon each side of the wires. (See Fig. 10.) These layers of metal sheet and wires are rolled up, as shown in Fig. 3. The sheet metal would form a volute or spiral scroll, and the wires would be simple spirals. Of course it is evident that the sheet metal $d$ may be stamped up into semi-cylinders and flat plates, which may be coupled together to form the spiral scroll shape, as indicated in the magnet $b$ of Fig. 3, and the separations due to this method of forming the magnets will act as a guard against Foucault currents being set up in the cores. The magnets so formed are clamped between the pole-pieces and the butts or neutral plates or castings C by heavy steel bolts E, which pass through solid cores of cast-iron, wrought-iron, or steel, $e$, (see Fig. 14,) which form supports for the magnets and act as additional cores to increase the magnetic field and increase the reciprocative induction. The pole-pieces and the parts C have flanges or beads $c$, which encircle the ends of the magnets $a$ $b$ and prevent any possibility of their spreading or unwinding. The inner ends of the spiral conductors $d'$ so formed are brought through the hollow space between the core-pieces $e$ and to the castings C, as indicated at D', Fig. 3. The outer ends of these magnet-coils are exposed, and those of the north and south pole magnets may be joined, as indicated at D, and the corresponding inner ends may also be joined together. Then the inner union, D', is connected to the outer union, D, of the next pair of coils, and so on, as indicated in Fig. 6. From this it will be seen that the corresponding coils on each magnet are coupled in multiple-arc connection, and such pair is coupled in series with the next pair, and so on. This construction enables the winding to be as shown in Figs. 1 and 3.

The winding shown in Fig. 7 is illustrated graphically in Fig. 8, from which it will be seen that it is substantially the same as that shown in Fig. 6, except that one terminal of the last coil is left open, and the number of coils in circuit is controlled by the contact O working on contact-blocks $D^2$, formed on the connecting-wires D. This contact O terminates in an adjusting-rod, O', working through an insulated guide, $O^2$, upon which it is clamped by a set-screw, $o$. The line-wire K connects with the binding-post J' on said guide, and hence is in circuit with the contact O. This specific construction is shown in Fig. 7. It will be observed that, as shown, the contact O cannot cut out all of the field-coils, its object being merely to regulate the field strength, yet it is evident that it may be extended to cut out all the coils.

Another winding is shown in Fig. 9, in which all of the inner terminals of the coils are connected by wires D' in connection with the line-circuit, and all the outer terminals are connected as before. In this case the contact-blocks $D^2$ are provided in the wires D, as before, and the contact O is adapted to touch all or as few of said contacts at once as desired. As shown, the four right-hand pairs of coils are in multiple-arc connection with the wires D' and contact O, and hence with the line-circuit, and the two left-hand pairs of coils have their outer ends coupled together, and the tendency of the electric current is in opposite directions and counterbalanced; hence these coils are in effect cut out. This may be termed a "negative" method of regulation.

In the winding shown in Fig. 12 we have the current passing in opposite directions in the $a$ and $b$ magnets, and hence we have the inner end of the $a$ magnet coil coupled with the inner end of the next $b$ magnet coil, and the outer end of this last coil with the outer end of the next $a$ magnet-coil, and so on in series, all of the coils in each magnet being in series with all the rest. It is evident that the coils of each field-magnet may have its coils coupled in multiple arc, such as if we remove the lower part of Fig. 9, and such field-magnets may be coupled in series; or it is evident that each of the coils on each magnet may be coupled in series, as indicated in Fig. 11, and such field-magnets may be coupled in series or multiple-arc connection.

There is still another type of winding to which I would call attention, and that is illustrated in Fig. 13. Here we have the inner ends of the coils of the $a$ and $b$ magnets coupled in pairs or triplets, and their outer ends coupled as before, and such pairs of coils are connected in series with each other by a connection somewhat similar to that shown in Fig. 6. These types of winding will illustrate the essential principles to be carried out when the machines are desired for special purposes. It is evident that the cut-out principle is capable of embodiment into any of the various forms of winding, and while not shown in the motor illustrated in Fig. 1, 2, and 3, yet it may readily be applied thereto.

The peculiar winding of the field-magnets enables a constant circulation of air from the interior outward along or between the spiral coils of the said magnets, causing the heat to be carried off and in a measure keeping the machine cool.

H is the armature, which in Fig. 1 is shown as in multiple-arc connection with the field-magnets, such as found in shunt-wound machines; but in Fig. 7 the armature and field-magnets are coupled up in series, as is customary in series-wound machines.

F is the armature-shaft, and one end passes through the brass bearing F', bolted to one end of the pole-pieces, and carries upon its outer end the belt-pulley $f$. The other end of the armature is journaled in the brass bearing $F^2$, bolted between the two arms A', extending from the pole-pieces to form a suitable space for the commutator G. Upon this shaft are secured the armature hubs H', of brass or non-magnetic metal. Upon these hubs are secured a series of radial pole-pieces $H^2$, of cast or wrought iron, the latter being preferred. Wrapped about these pole-pieces and over the hubs is a wire coil, $H^2$, which may, for the prevention of Foucault currents, be coated with an insulating-lacquer. These coils would be formed of fine soft-iron wire, and would act as a core for the armature-coils. The spaces between the wires forming this core and around the hubs form means of ventilation. Wrapped about the cylinder so formed are the main armature-coils, which are bounded by the pole-pieces, and these coils are subdivided into two or more coils, $h$, coupled together in multiple arc connection by wires $H^4$, and such coils are connected to the various sections $g$ of the commutator G, as shown in Figs. 4 and 5, the winding being essentially that known as "Siemens winding." The sub-coils $h$ are divided by radial planes passing through the axle F, so as to bring the said coils all the same distance from the magnetic core. From this construction it will be seen that the current passes from one brush G' to the commutator-section; then it subdivides, passing over the several coils, and then reunites again and passes to the next commutator-section, and so on until it reaches the other brush G'. The connections of the winding may be followed by the figures 1 to 16 in Figs. 4 and 5, and the direction of passage of the currents over the coils may be understood from the arrows in Fig. 4.

The commutator G is formed with its sections made double, the parts $g$ and $g'$ being set at different angles corresponding to the change in the lead required for the brushes in reversing the motor. By shifting the brushes over the said commutator, or shifting the commutator under the brushes, the lead may be changed, and if the current passing through the armature be reversed, the motor will run backward, or change its direction of rotation. There are several ways of accomplishing this result. In the construction shown in Figs. 1, 2, 3, and 6, the brushes are connected to guide-posts $G^2$, which are secured to and insulated from a cross-bar, $G^3$, and are guided in guides $F^3$, having insulated boxes $f^3$. The cross-bar $G^3$ carries a polarized armature or core, $G^4$, which is operated by an electro-magnet or helix, I, carried by a bracket, $i$, secured to or formed on the bearing $F^2$ of the machine.

M is the armature-circuit, and N is a reversing-switch for reversing the current flowing through the armature from the line K K. The magnet or helix I is in a shunt-circuit, I', and in multiple-arc connection with the armature, but might be in series therewith. As the current in the armature-circuit is reversed the current in the helix I is also reversed, and the armature or core would be attracted, shifting the brushes to the portions $g'$ of the commutator sections and giving the proper lead to the brushes with reference to the commutator-sections. When the current is reversed again, the reverse order of movements takes place. From this it will be observed that the switch which reverses the current in the armature-circuit also actuates the brush-shifting devices, whereby these operations take place simultaneously.

In place of making the armature a polarized armature, it may be simply soft iron, and springs S (see dotted lines, Fig. 6) may be used to oppose the action of the magnet I. In this case the portion S' of the shunt I' would be dispensed with, and the dotted circuit $s$ added, so that when reversing the current by shifting the switch N the circuit I $s$ would be closed and the armature $G^4$, with its brushes, shifted to give the proper lead, as before.

In the construction shown in Fig. 16 the commutator is shifted and the brushes are held stationary, the general method of operation being the same as before. In the construction shown in Fig. 15 we have an ordinary commutator with brushes movable about its axis, and said brushes may be moved about the axis to change the lead of the brushes by either of the arrangements of circuits and magnets set out in Fig. 6. I do not limit myself to any specific form of apparatus for moving the brushes or commutator automatically, as they may be made in any way, so far as the broad principle of my invention is concerned.

Referring now to Fig. 17, we have the line-circuit K divided into an armature-circuit, M, having a resistance-changer, P, and a circuit-reverser, N, and a field-magnet circuit, L, with a resistance-changer, R, and current-reverser T in it. This would be what is known as a "shunt-wound machine," and enables the strength of the field to be varied or reversed independently of the resistance in the armature or the direction of current passing through the said armature, and vice versa. This construction enables the peculiar regulation of motors set out in the preamble of this specification, and is very advantageous.

The peculiar method of shifting the brushes or commutator may be used to give a sufficient lead to reverse the motor without the necessity of reversing the armature-current, as it is evident that with slight modification this result could easily be attained. The principle of using a reversed current or an interrupted current to cause a relative movement between the brushes and commutator would remain substantially the same whether or not the armature-current were reversed. The direction of rotation of the armature necessarily changes the position of the maximum and minimum potential on the commutator, and therefore this device would work excellently where the reversal of the motor depended upon the reversal of the armature-current and the movement between the commutator and brushes was simply designed to shift the parts sufficiently to bring them in the best operative condition.

It is evident that the details of construction may be modified and changed in various ways without departing from the broad issues of my invention.

In this application I do not claim the broad construction of the field-magnets and armature with independent means of regulation, as that will be prosecuted in my application Serial No. 208,418.

Having now described my invention, what I claim as new, and desire to secure by Letters Patent, is—

1. In an electric motor or dynamo, the field-magnets formed of insulated spiral conductors arranged between the layers of a volute of magnetizable metal, substantially as and for the purpose specified.

2. In an electric motor or dynamo, the field-magnets formed of insulated spiral conductors arranged between the layers of a volute of magnetizable metal, and said volute of magnetizable metal being split longitudinally, substantially as and for the purpose specified.

3. In an electric motor or dynamo, the field-magnets formed of insulated spiral conductors arranged between the layers of a volute of magnetizable metal and central solid cores, substantially as and for the purpose specified.

4. In an electric motor or dynamo, the combination of the armature with the two field-magnets having their poles which are adjacent to the armature of opposite polarity, the conductors composing said field-magnets having their cores composed of layers of magnetizable metal interposed between spiral coils of insulated conductors, and in which the inner ends of each of the conductors of the said field-magnets are connected with the outer ends of the next adjacent coils, whereby said coils on said magnets are arranged in series with each other.

5. In an electric motor or dynamo, the combination of the armature with the two field-magnets having their poles which are adjacent to the armature of opposite polarity, the conductors composing said field-magnets having their cores composed of layers of magnetizable metal interposed between spiral coils of insulated conductors and in which the inner ends of the conductors of the field-magnets are connected in multiple arc with each other and in series with the outer ends of the next adjacent coils, whereby said coils on each of said magnets are arranged in series with each other.

6. In an electric motor or dynamo, the combination of the armature with the two field-magnets having their poles which are adjacent to the armature of opposite polarity, the conductors composing said field-magnets having their cores composed of layers of magnetizable metal interposed between spiral coils of insulated conductors and in which the inner ends of two or more of the conductors of said field-magnets are coupled in multiple-arc connection with each other and in series with the outer ends of other coils, substantially as and for the purpose specified.

7. In an electric motor or dynamo, the combination of the armature with the two field-magnets having their poles which are adjacent to the armature of opposite polarity, the said field-magnets having their cores composed of layers of magnetizable metal and provided with interposed spiral coils of insulated conductors and in which the inner ends of two or more of the conductors of said field-magnets are coupled in multiple-arc connection with each other and in series with the inner and outer ends of other coils, substantially as and for the purpose specified.

8. An electric motor or dynamo machine having the coils of insulated conductors on each of its field-magnets composed of a series of spirals having their inner and outer ends or terminals connected in series with the line-conductors, in combination with said line-conductors.

9. In an electric motor or dynamo, the combination of the rotating armature, field-magnets having their coils composed of spirals, and line conductors and connections in which the terminals of each of the spirals of the field-magnet coils have their inner and outer ends or terminals connected with the line in series and with the armature in multiple-arc connection.

10. In an electric motor or dynamo, the field-magnets having their coils each formed of a series of spirals, each spiral extending from the center to the surface of the field-magnet and arranged with interposed layers of magnetizable metal, upon which the coils are wound, in combination with means to cut one or more of said spiral coils out of circuit, substantially as and for the purpose specified.

11. In an electric motor or dynamo, the two field-magnets, each formed of a series of spiral coils having their inner and outer ends electrically connected, respectively, in combination with means to cut out one or more of said spiral coils from each magnet, substantially as and for the purpose specified.

12. In an electric motor or dynamo, the two field-magnets, each formed of a series of spiral coils having their inner and outer ends electrically connected, respectively, in combination with means to simultaneously cut out one or more of said spiral coils from each magnet, substantially as and for the purpose specified.

13. In an electric motor or dynamo, the field-magnets, each having the coils formed of spirals with interposed corresponding layers of magnetizable metal upon which the coils are wound, in combination with means to cut one or more of said spiral coils out of circuit, substantially as and for the purpose specified.

14. The combination, in a dynamo-electric machine or motor, of the cast-iron pole-pieces having flat faces, cores of ductile magnetizable metal made in layers and secured to said pole-pieces end on, and coils of magnetizing-wire wound thereon.

15. In a dynamo-electric machine or motor, the combination of independent pole-pieces, cores made up of layers, and butt, with longitudinal clamping-bolts secured to and connecting the pole-pieces with the butt and clamping them tightly upon the ends of the cores.

16. The combination, in a dynamo-electric machine or motor, of the cast-iron pole-pieces having flat faces, cores of ductile magnetizable metal made in layers and secured to said pole-pieces end on, a butt-piece to bridge the cores, longitudinal clamping-bolts extending from the butt to the pole-pieces to clamp the parts together, and coils of magnetizing-wire wound upon said cores.

17. In an electric motor or dynamo, the combination of the armature, the pole-pieces, and butts or neutral parts of the field-magnets formed of cast iron, interposed cores between said pole and butt pieces formed of volutes of a ductile magnetizable metal, and suitable means to clamp the parts together, substantially as and for the purpose specified.

18. In an electric motor or dynamo, the combination of the armature, the pole-pieces and butts or neutral parts of the field-magnets formed of cast iron, interposed cores between said pole and butt pieces formed of a ductile magnetizable metal, having longitudinal slits through the same and suitable means to clamp the parts together, substantially as and for the purpose specified.

19. In an electric motor or dynamo, the combination of the armature, the pole-pieces and butts or neutral parts of the field-magnets formed of cast-iron, interposed cores between said pole and butt pieces formed of a series of layers of a ductile magnetizable metal parallel to the axis of the magnets, insulated conductors between said layers, and suitable means to clamp the parts together, substantially as and for the purpose specified.

20. In an electric motor or dynamo, the combination of the armature with the two field-magnets having their poles which are adjacent to the armature of opposite polarity, the conductors composing said field-magnets having their cores composed of layers of magnetizable metal interposed between spiral coils of insulated conductors and in which the inner ends of the conductors of the said field-magnets are connected with the outer ends of the next adjacent coils on the same field-magnets, whereby said coils on each of said magnets are arranged in series with each other, and means to cut out one or more of the coils of the field-magnets, substantially as and for the purpose specified.

21. In an electric motor or dynamo, the combination of the pole-pieces and butts or neutral parts of the field-magnets formed of cast-iron, interposed cores between said pole and butt pieces formed of a ductile magnetizable metal, and suitable means to clamp the parts together, with cast-iron core-pieces arranged within the ductile cores, substantially as and for the purpose specified.

22. In an electric motor or dynamo, the combination, in the field-magnets, of solid pole-pieces and cores formed of magnetizable sheet metal bound into volutes by the conductor-coils, substantially as and for the purpose specified.

23. In an electric motor or dynamo, the combination of the armature with the field-magnets having solid pole-pieces and cores formed of magnetizable sheet metal bound into volutes by the conductor-coils and flanges which project from the pole-pieces over the edge of the cores, substantially as and for the purpose specified.

24. In an electric motor or dynamo, the combination of the two field-magnets having hollow cores, and having their conductor-coils formed like a series of spirals, the inner terminals of which are brought through the hollow portions of the cores, substantially as and for the purpose specified.

25. A dynamo or electric motor having its field-magnets formed with cores made hollow and in several layers, and provided with coils of conductors arranged between said layers of the cores, and having their inner terminals extended into the hollow portion of the core, substantially as and for the purpose specified.

26. The combination of the two field-magnets formed with spiral air-passages extending from the outside to the interior thereof, substantially as and for the purpose specified.

27. The combination of the pole-pieces A B of the field-magnets, the spiral scroll or volute field-magnets $a\ b$, the connecting-conductors D, the line-circuit, and the cut-out switch working in contact with said conductors D, substantially as and for the purpose specified.

28. In an electric motor, the combination of the commutator with movable brushes to change the lead of the brushes required for reversing the motor and an electro-magnet to shift said brushes, substantially as and for the purpose specified.

29. In an electric motor, the combination of the commutator with movable brushes to change the lead of the brushes required for reversing the motor, an electro-magnet to shift said brushes, an electric circuit including the said electro-magnet, and a switch device to control the current passing over the same, substantially as and for the purpose specified.

30. In an electric motor, the combination of the commutator with movable brushes to change the lead of the brushes required for reversing the motor, an electro-magnet to shift said brushes, an electric circuit including the said electro-magnet, and a switch device to reverse the current passing over the same, substantially as and for the purpose specified.

31. In an electric motor, the combination of the commutator with movable brushes to change the lead of the brushes required for reversing the motor, an electro-magnet to shift said brushes, an electric circuit including the said electro-magnet, a switch device to control the current passing over the same, an armature-circuit, and means to reverse the current in said armature-circuit, substantially as and for the purpose specified.

32. In an electric motor, the combination of the commutator with movable brushes to change the lead of the brushes required for reversing the motor, an electro-magnet to shift said brushes, an armature-circuit, and a circuit including said electro-magnet and a switch to simultaneously reverse the current in both of said circuits, substantially as and for the purpose specified.

33. In an electric motor, the combination of the commutator with the movable brushes to change the lead of the brushes required for reversing the motor, a polarized armature connecting with said brushes, an electro-magnet to actuate said polarized armature, and means to cause a current to flow through said electro-magnet in either direction, substantially as and for the purpose specified.

34. In an electric motor, the combination of the commutator with the movable brushes to change the lead of the brushes required for reversing the motor, a polarized armature connecting with said brushes, an electro-magnet to actuate said polarized armature, means to cause a current to flow through said electro-magnet in either direction, an armature-circuit, and means to reverse the current in said armature-circuit, substantially as and for the purpose specified.

35. In an electric motor, the combination of the commutator and brushes movable relatively with respect to each other to change the lead of the brushes required for reversing the motor, an electro-magnet to produce said movement between the brushes and commutator, a circuit including said magnet, and means to control said circuit at times of reversing the motor.

36. In an electric motor, the combination of the commutator and brushes movable relatively with respect to each other to change the lead of the brushes required for reversing the motor, an electro-magnet to produce said movement between the brushes and commutator, a circuit including said magnet, an armature-circuit, and means for reversing the current in the armature-circuit and controlling the current in the lead-controlling magnet, substantially as and for the purpose specified.

37. In an electric motor, the combination of the commutator and brushes movable relatively with respect to each other to change the lead of the brushes required for reversing the motor, an electro-magnet to produce said movement between the brushes and commutator, a circuit including said magnet, an armature-circuit, and means for reversing the currents in both of said circuits.

38. In an electric motor, the combination of the field-magnets, the armature, the commutator and brushes relatively movable to change the lead of the brushes required for reversing the motor, a reversing electro-magnet for moving said brushes and commutator relatively to each other, a field-magnet circuit, an armature-circuit, and a reversing magnet-circuit, substantially as and for the purpose specified.

39. In an electric motor, the combination of the field-magnets, the armature, the commutator and brushes relatively movable to change the lead of the brushes required for reversing the motor, a reversing electro-magnet for moving said brushes and commutator relatively to each other, a field-magnet circuit, an armature-circuit, and a switch for reversing the current flowing in the armature-circuit, and a reversing magnet-circuit, substantially as and for the purpose specified.

40. In an electric motor, the combination of the field-magnets, the armature, the commutator and brushes relatively movable to change the lead of the brushes required for reversing the motor, a reversing electro-magnet for moving said brushes and commutator relatively to each other, a field-magnet circuit, an armature circuit, a switch for reversing the current flowing in the armature-circuit and also the current flowing over the reversing magnet-circuit, and a reversing magnet-circuit, substantially as and for the purpose specified.

41. In an electric motor, the combination of the field-magnets, the armature, the commutator and brushes relatively movable to change the lead of the brushes required for reversing the motor, a reversing electro-magnet for moving said brushes and commutator relatively to each other, a field-magnet circuit, an armature-circuit, a switch for reversing the current flowing in the armature-circuit, a variable resistance in said armature-circuit, and a reversing magnet-circuit, substantially as and for the purpose specified.

42. In an electric motor, the combination of the field-magnets, the armature, and the commutator and its brushes made relatively movable to change the lead of the brushes required for reversing the motor, a field-magnet circuit, an armature-circuit distinct from the field-magnet circuit, and means to reverse the armature-circuit, substantially as and for the purpose specified.

43. In an electric motor, the combination of the field-magnets, the armature, and the commutator and its brushes made relatively movable to change the lead of the brushes required for reversing the motor, a field-magnet circuit, an armature-circuit distinct from the field-magnet circuit, means to reverse the armature-circuit, and a variable resistance in the armature-circuit, substantially as and for the purpose specified.

44. In an electric motor, the combination of the field-magnets, the armature, and the commutator and its brushes made relatively movable to change the lead of the brushes required for reversing the motor, a field-magnet circuit, an armature-circuit distinct from the field-magnet circuit, means to reverse the armature-circuit, and means to vary the strength of the field-magnets, substantially as and for the purpose specified.

45. In an electric motor, the combination of the field-magnets, the armature, and the commutator and its brushes made relatively movable to change the lead of the brushes required for reversing the motor, a field-magnet circuit, an armature-circuit distinct from the field-magnet circuit, means to reverse the armature-circuit, a variable resistance in the armature-circuit, and means to vary the strength of the field-magnets, substantially as and for the purpose specified.

46. In an electric motor, the combination of the commutator and its brushes made relatively movable to change the lead of the brushes for reversing the motor and automatic electric devices under the control of the operator to change the lead in reversing.

47. In an electric motor, the combination of the commutator and its brushes made relatively movable to change the lead of the brushes for reversing the motor, automatic electric devices under the control of the operator to change the lead in reversing, and means to reverse the current flowing through the brushes simultaneously therewith.

48. In an electric motor or dynamo, an armature having its coils wound in sections, and each section subdivided into two or more coils, whereby the current after leaving the commutator divides over the subdivisions of the coil-section and reunites before passing back to the commutator, substantially as and for the purpose specified.

49. An armature having its coils corresponding to the number of sections of the commutator or a multiple thereof, and each coil subdivided into two or more parallel coils coupled in multiple arc with each other, substantially as and for the purpose specified.

50. An armature having a series of poles, and two or more coils interposed between said poles and connected in multiple arc with each other, substantially as and for the purpose specified.

51. An armature having a magnetizable core and its coils arranged upon said core and divided by radial planes from the armature-axis, said coils being coupled in pairs or triplets in multiple-arc connection, and such pairs or triplets being coupled in series connection with each other, substantially as and for the purpose specified.

52. An armature having a magnetizable core and its coils arranged upon said core and divided by radial planes from the armature-axis, said coils being coupled in pairs or triplets in multiple-arc connection, such pairs or triplets being coupled in series connection with each other, in combination with a commutator and connections to connect one terminal of said pair or triplet coils with sections of the commutator and the other terminals with the next adjacent commutator-sections to which their first-mentioned terminals were connected, substantially as and for the purpose specified.

53. The combination of shaft F, brass spiders or hubs H', pole-pieces H², secured upon the brass hubs, core H³, of wire, wound about the bases of the pole-pieces, coils $h\ h\ h$, arranged about the core and between the pole-pieces and coupled in multiple-arc connection, and a commutator having its sections connecting with said coils, substantially as and for the purpose specified.

54. In an electric motor or dynamo, the two field-magnets, each formed of a series of spiral coils having their inner and outer ends electrically connected, respectively, in combination with means to cut out one or more of said spiral coils from each magnet and means for varying the armature-current independently of the field-magnets, substantially as and for the purpose specified.

55. In an electric motor or dynamo, the two field-magnets, each formed of a series of spiral coils having their inner and outer ends electrically connected, respectively, in combination with means to cut out one or more of said spiral coils from each magnet, and an adjustable resistance in the armature-circuit, substantially as and for the purpose specified.

56. In an electric motor or dynamo, the two field-magnets, each formed of a series of spiral coils having their inner and outer ends electrically connected, respectively, in combination with means to cut out one or more of said spiral coils from each magnet, and a circuit-reverser in the armature-circuit, substantially as and for the purpose specified.

57. In an electric motor or dynamo, the two field-magnets, each formed of a series of spiral coils having their inner and outer ends electrically connected, respectively, in combination with means to cut out one or more of said spiral coils from each magnet, and a circuit-reverser and variable resistance in the armature-circuit, substantially as and for the purpose specified.

58. In an electric motor or dynamo, the two field-magnets, each formed of a series of spiral coils having their inner and outer ends electrically connected, respectively, in combination with means to cut out one or more of said spiral coils from each magnet, a circuit-reverser and variable resistance in the armature-circuit, and a circuit-reverser for the field-circuit, substantially as and for the purpose specified.

In testimony of which invention I hereunto set my hand.

RUDOLPH M. HUNTER.

Witnesses:
RICHD. S. CHILD, Jr.,
E. M. BRECKINREED.